United States Patent [19]

Warren

[11] Patent Number: 5,388,885
[45] Date of Patent: Feb. 14, 1995

[54] BODY STRUCTURE OF A MOTOR VEHICLE

[75] Inventor: James R. Warren, Lincoln Park, Mich.

[73] Assignee: General Motors Corporation, Detroit, Mich.

[21] Appl. No.: 11,558

[22] Filed: Feb. 1, 1993

[51] Int. Cl.⁶ ............................................. B62D 25/20
[52] U.S. Cl. ..................... 296/203; 296/209
[58] Field of Search ............... 296/203, 204, 209, 197

[56]           References Cited
             U.S. PATENT DOCUMENTS

| 4,493,506 | 1/1985 | Alexander ........................... 296/209 |
| 4,582,357 | 4/1986 | Nakamura et al. ............. 296/209 X |
| 4,911,495 | 3/1990 | Haga et al. ........................... 296/209 |

*Primary Examiner*—Joseph D. Pape
*Attorney, Agent, or Firm*—Charles E. Leahy

[57]           ABSTRACT

A vehicle body structure of a vehicle has a pair of body side frame sub-assemblies running longitudinally on the vehicle and an underbody sub-assembly extending transversely across the vehicle. Each of the body side frame assemblies has a body side outer panel having a lower horizontal flange extending longitudinally and projecting outboard, and a forward vertical flange projecting outboard. A longitudinally extending rocker inner frame of the body side frame assembly has an inboard vertical wall spaced inboard from the body side outer panel and a lower horizontal wall projecting outboard having an extreme outboard portion underlying the lower horizontal flange of the body side outer panel. The underbody sub-assembly has a generally planar floor pan having a pair of longitudinal edges and a horizontal surface adjacent to each of the longitudinal edges underlying and engaging the lower horizontal wall of the rocker inner frame of one of the body side frame sub-assemblies. The horizontal surface of the floor pan secures to the extreme outboard portion subsequent to the underbody sub-assembly being adjusted transversely relative to the body side frame sub-assemblies.

10 Claims, 5 Drawing Sheets

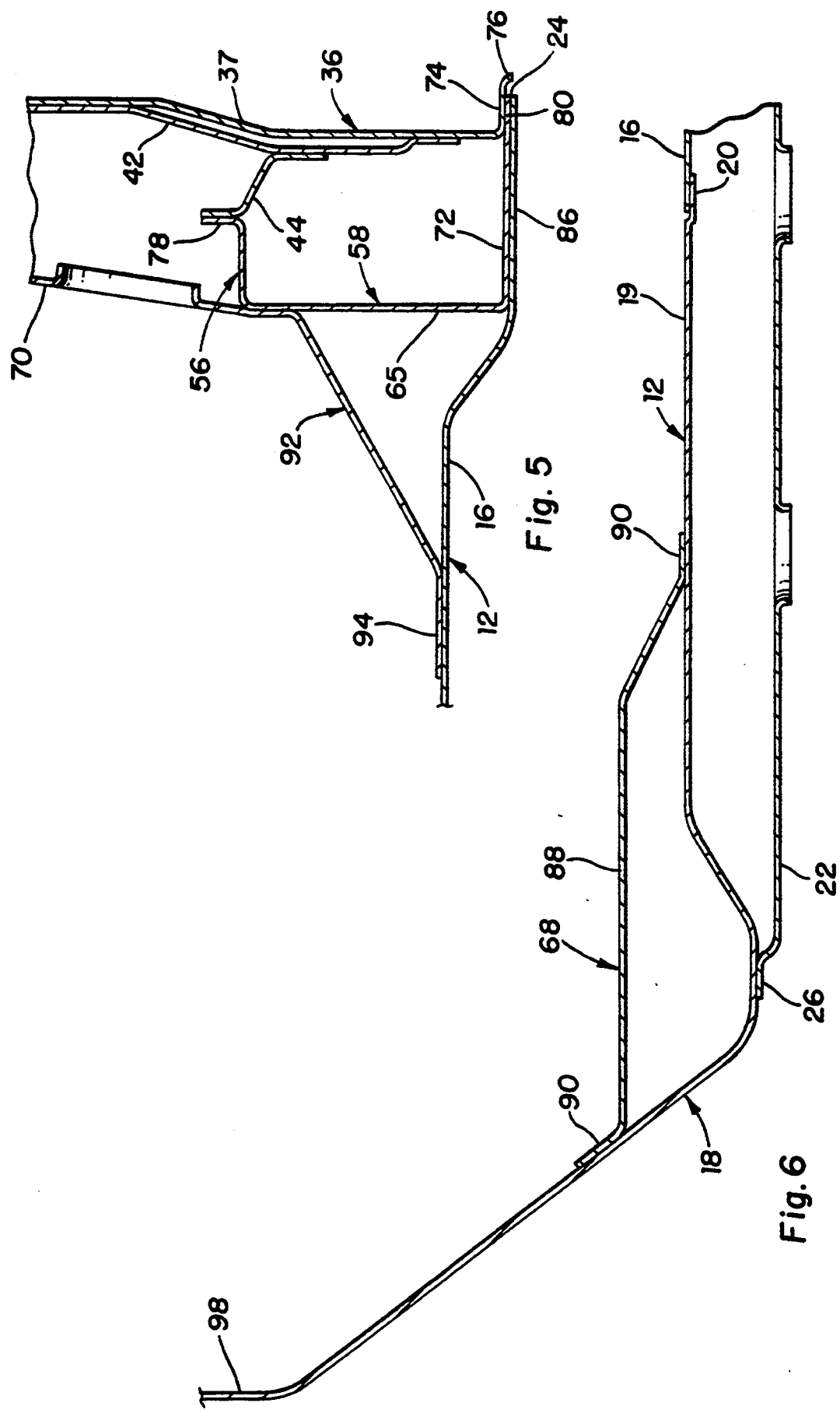

BODY STRUCTURE OF A MOTOR VEHICLE

BACKGROUND OF THE INVENTION

1. Field of the Invention

This invention relates to a body structure of a motor vehicle and more particularly to an underbody sub-assembly and a body side frame sub-assembly and the securing of the assemblies together.

2. Description of the Relevant Art

Modern day motor vehicles typically have a unibody constructed of a series of panel members and U-shaped or channel shaped frame members of stamped sheet metal. The members are placed and clamped in a jig in order to position the members relative to each other for welding together to form a body structure.

It is known to assemble several sub-assemblies, including a pair of body side frame sub-assemblies and an underbody sub-assembly prior to placing the sub-assemblies in the jig and welding them together to form the body structure. Referring to FIG. 10, each of the body side frame sub-assemblies 120 has a box structure 122 extending longitudinally having a downward depending flange 124 that extends parallel to the centerline of the vehicle. The body side frame sub-assemblies are precisely spaced from each other in the jig. The underbody sub-assembly 126 is a generally planar floor pan member 128 which has a pair of outboard downward depending flanges 130. The underbody sub-assembly is raised upward into the jig between the two precisely spaced body side frame sub-assemblies and clamped so that the downward depending flanges can be welded together. The downward depending flanges on both the underbody and the body side frame sub-assemblies might require flexing in order to position and secure the underbody sub-assembly to the precisely spaced body side frame sub-assemblies. The flexing required to clamp the flanges together could be result of build variations which resulted in material thickness and dimension variations and cause in stress in the sub-assemblies.

When the body structure is removed from the jig after the sub-assemblies are welded together, it is possible that the body structure may flex to relieve the stress. The body structure must later be adjusted to compensate for the flex in order to ensure that the exterior panels and doors fit properly.

It would be desirable to have a vehicle body where the assemblies are positioned relative to each other for securing to each other so that any minor build variation in one of the assemblies does not compound during assembly of the assemblies, thereby the vehicle body is assembled without unnecessary stress on the body structure.

SUMMARY OF THE INVENTION

This invention provides a vehicle body structure of a vehicle having a pair of body side frame sub-assemblies running longitudinally on the vehicle and an underbody sub-assembly extending transversely across the vehicle. Each of the body side frame assemblies has a body side outer panel having an appearance portion extending vertically and longitudinally, a lower horizontal flange extending longitudinally and projecting outboard, and a forward vertical flange projecting outboard. A longitudinally extending rocker inner frame of the body side frame assembly has an inboard vertical wall spaced inboard from the body side outer panel and a lower horizontal wall projecting outboard having an extreme outboard portion underlying the lower horizontal flange of the body side outer panel. An inverted "U" shaped cross member extension is secured to the inboard vertical wall of the rocker inner frame and projects transversely inboard. The underbody sub-assembly has a generally planar floor pan having a pair of longitudinal edges and a horizontal surface adjacent each of the longitudinal edges which underlies and engages the lower horizontal wall of the rocker inner frame of one of the body side frame sub-assemblies. An inverted "U" shaped cross member extending transversely and overlying and secured to the floor pan has a pair of ends. Each end underlies one of the cross member extensions. The horizontal surface of the floor pan secures to the extreme outboard portion and the cross member secures to the cross member extension subsequent to the underbody sub-assembly being adjusted transversely relative to the body side frame sub-assemblies. A dash panel has a horizontal portion including a lip secured to the floor pan and a generally vertical firewall portion flexed and conforming to the forward vertical flange of the body side outer panel of the body side frame sub-assemblies.

One object, feature and advantage of the body structure of the vehicle is that an underbody sub-assembly transverses the vehicle and underlies the body side frame assemblies and is secured to the body side frame sub-assemblies by a horizontal surface of the floor pan welded to a horizontal surface of the body side frame sub-assemblies whereby the horizontal surfaces can move transverse to each other prior to being welded to each other allowing for transverse variations between the body side frames and underbody sub-assemblies.

Further objects, features and advantages of the present invention will become more apparent to those skilled in the art as the nature of the invention is better understood from the accompanying drawings and detailed description.

BRIEF DESCRIPTION OF THE DRAWINGS

FIG. 5 is a sectional view taken at 5—5 in FIG. 1 of a transverse section of the interface between the underbody and the body side frame at the center or "B" pillar;

FIG. 6 is a sectional view taken at 6—6 in FIG. 1 of a longitudinal section of the interface between the underbody and the body side frame including the longitudinal member and the front body hinge or "A" pillar inner panel;

DESCRIPTION OF THE PREFERRED EMBODIMENT

Figure 1:
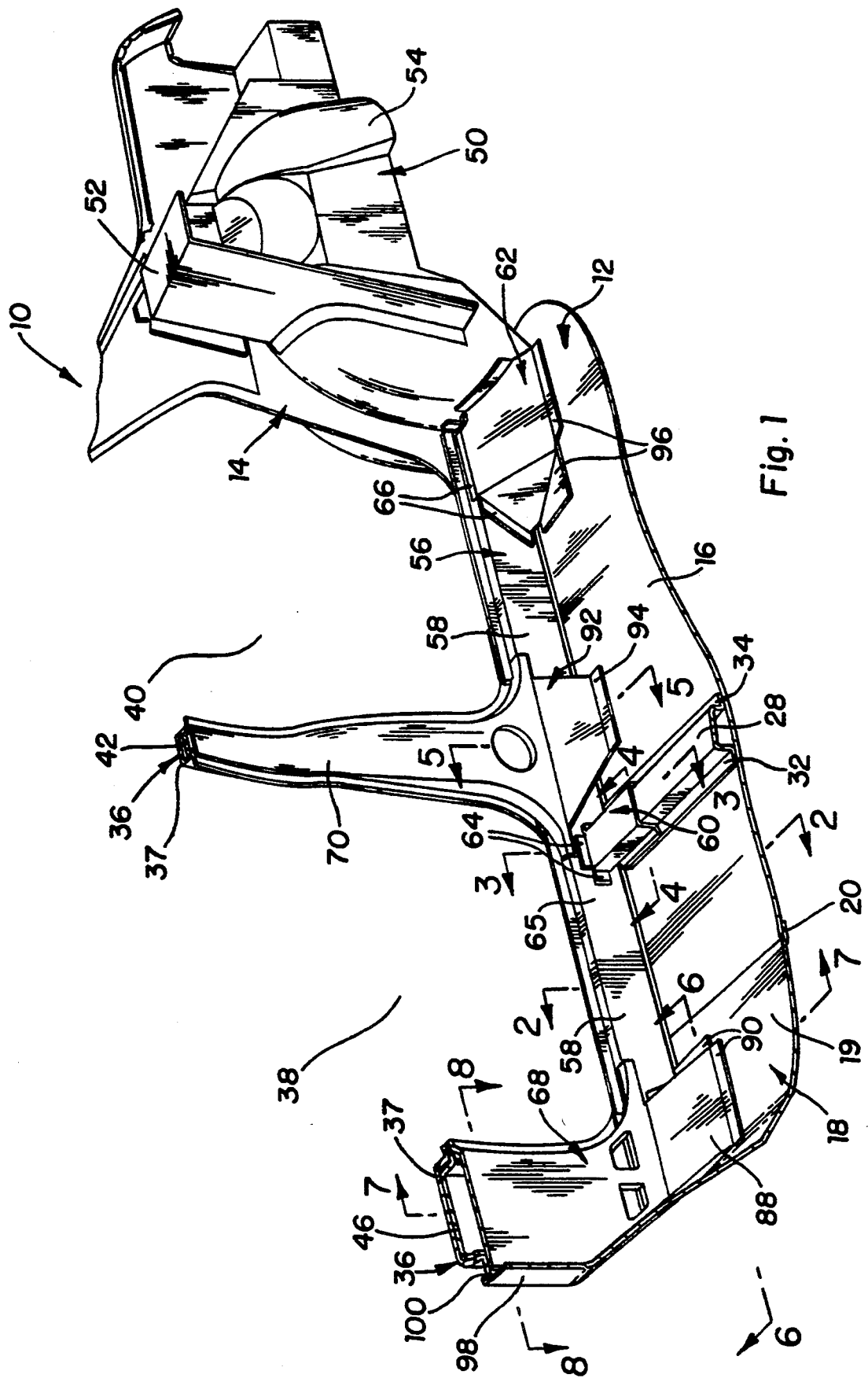
FIG. 1 is a Broken out perspective view of a vehicle body structure including the underbody sub-assembly and the body side frame sub-assembly—right.

Referring now to FIG. 1, a vehicle body structure 10 of a unibody construction is constructed in several separate sub-assemblies, including an underbody sub-assembly 12 and a body side frame sub-assembly—right 14, prior to the sub-assemblies being brought together in a body-in-white jig, not shown, to form the vehicle body structure 10.

Underbody Sub-assembly

Figure 4:
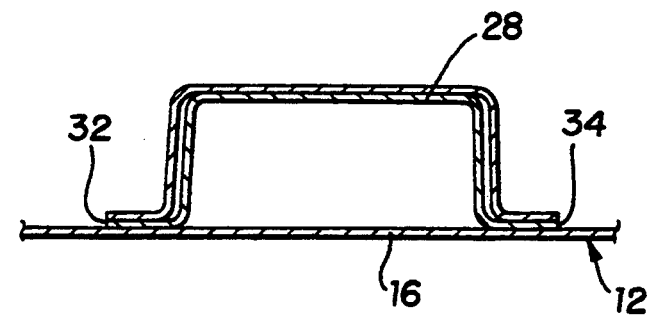
FIG. 4 is a sectional view taken at 4—4 in FIG. 1 of a longitudinal section of the interface of the cross member and the cross member extension.
Figure 7:
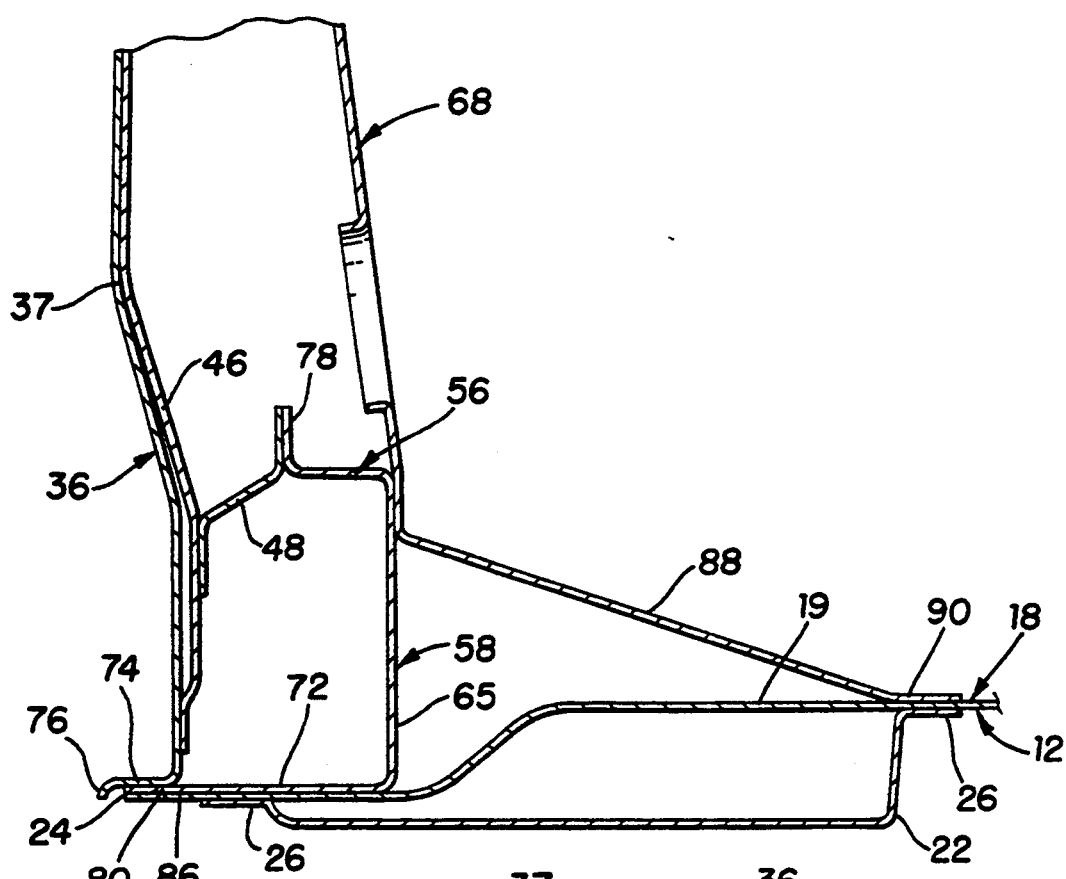
FIG. 7 is a sectional view taken at 7—7 in FIG. 1.

The underbody 12 includes a generally horizontal plate shaped floor pan 16 and a lower dash/toe panel 18. A horizontal portion 19 of the dash panel 18 has a rearward projecting lip 20 that underlies and is welded to a forward lower surface of the floor pan 16 as seen in FIG. 6. Referring to FIGS. 6 and 7, a longitudinal member 22 underlies the horizontal portion 19 of the dash panel 18 and the floor pan 16 near a right-hand longitudinal edge 24 and has a plurality of flanges 26 engaging and spot welded to the dash panel 18 and the floor pan 16 for adding longitudinal stiffness to the underbody 12. Referring to FIG. 1, an inverted "U" or channel shaped cross member 28 extends transversely over the floor pan 16 from near the right-hand longitudinal edge 24 to a left-hand longitudinal edge 29, shown in FIG. 9, for added transverse stiffness to the underbody 12. The cross member 28 has a pair of flanges 32 and 34 spot welded to the floor pan 16, as seen in FIG. 4.

Body Side Frame Sub-assembly

Figure 3:
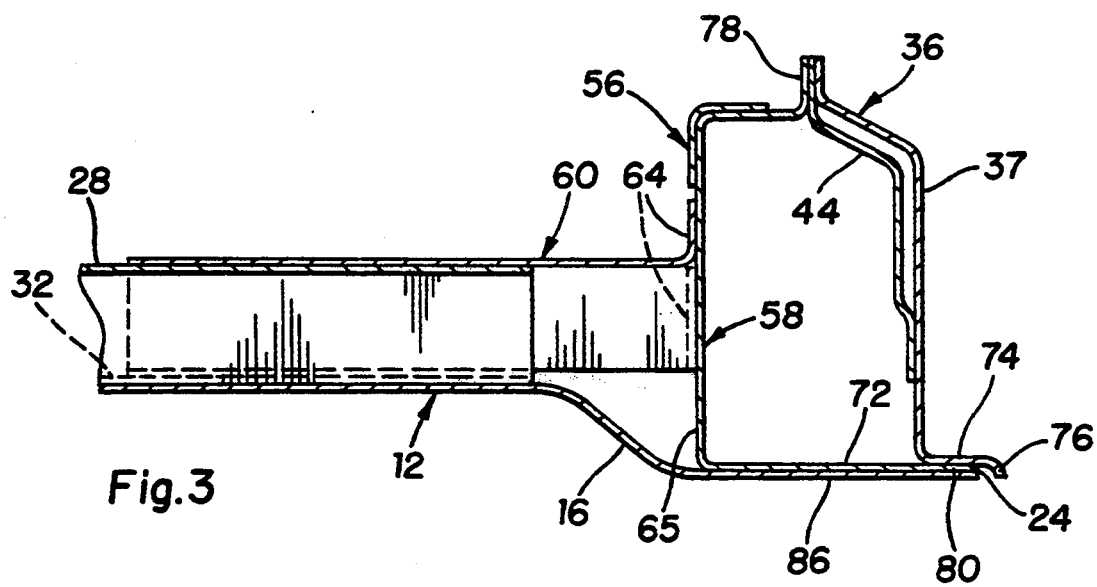
FIG. 3 is a sectional view taken at 3—3 in FIG. 1 of a transverse section of the interface between the underbody and the body side frame including the cross member and the cross member extension.

While the underbody sub-assembly 12 is being assembled, the body side frame sub-assembly—right 14 is also being assembled. Referring to FIG. 1, the body side frame 14 extends generally longitudinally and vertically and has a body side outer panel 36 consisting predominately of an appearance portion 37 that extends vertically and longitudinally and has a pair of door openings 38 and 40. Referring to FIGS. 1, 3, and 5, a center or "B" pillar reinforcement 42, which extends generally vertically upward between the door openings 38 and 40, and a center or "B" pillar lower reinforcement 44, which underlies the door openings 38 and 40, are located inboard of the body side outer panel 36. Likewise referring to FIGS. 1, 7 and 8, a front body hinge or "A" pillar reinforcement 46, which extends generally vertically upward forward of the door opening 38, and a front body hinge or "A" pillar lower reinforcement 48, which underlies the door opening 38, are similarly located inboard of the body side outer panel 36. The "B" pillar reinforcement 42, the "B" pillar lower reinforcement 44, the "A" pillar reinforcement 46, and the "A" pillar lower reinforcement 48 are secured to the body side outer panel 36 to form a portion of the body side frame sub-assembly—right 14 by loading and clamping into a side assembly jig, not shown, along with the body side outer panel 36 and welding together.

Referring to FIG. 1, a rear quarter inner sub-assembly 50 of the body side frame sub-assembly—right 14 includes a rear seat to back window extension 52 and a rear wheelhouse inner panel 54, which are welded together. After the rear quarter inner sub-assembly 50 is assembled, it is then loaded into the side assembly jig and welded to the body side outer panel 36 of the body side frame sub-assembly—right 14.

Referring to FIGS. 1 and 3, a rocker inner sub-assembly 56 includes a rocker inner frame panel 58, which extends longitudinally for underlying the pair of door openings 38 and 40, and a cross member extension 60 and a rear torque box cover 62. The cross member extension 60 projects transversely inboard and has a plurality of tabs 64 spot welded to an inboard vertical wall 65 of the rocker inner frame panel 58. Likewise, the torque box cover 62 has a plurality of flanges 66 spot welded to the rocker inner frame panel 58.

Referring to FIG. 1, a front body hinge or "A" pillar inner panel 68, a center or "B" pillar inner panel 70, and the rocker inner sub-assembly 56 are loaded into the side assembly jig inboard of and clamped to their respective adjacent elements of the body side frame sub-assembly—right 14 and welded. Referring to FIGS. 2, 3, 5, and 7, the rocker inner frame panel 58 has a lower horizontal wall 72 projecting outboard and includes an extreme outboard portion 80 which is underlying and engaging an outboard projecting horizontal flange 74 of the body side outer panel 36. The flange 74 of the body side outer panel 36 has a lip 76 which depends downward, outboard of the extreme outboard portion 80 of the lower horizontal wall 72 of the rocker inner frame panel 58. Referring to FIGS. 2, 3, 7, and 5, an upper flange 78 of the rocker inner frame panel 58 is engaging the body side outer panel 36, or the "A" or "B" pillar lower reinforcements 48 and 44, depending on the longitudinal position on the vehicle body structure 10.

Body Side Frame Sub-assembly—Left

Figure 9:
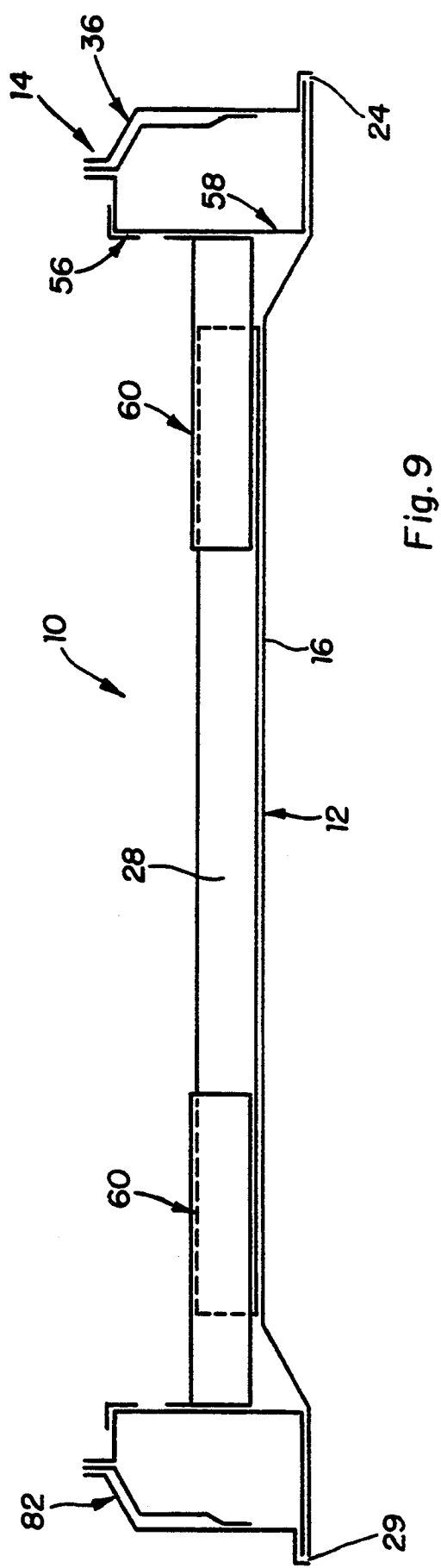
FIG. 9 is a schematic of a front view of the body structure of securing the underbody to the precisely spaced apart body side frame sub-assemblies.

Referring to FIG. 9, the vehicle body structure 10 has a body side frame sub-assembly—left 82 which is assembled in an identical method as the right side and is generally a mirror image of the body side frame sub-assembly—right 14.

Positioning the Sub-assemblies

With the underbody sub-assembly 12, the body side frame sub-assemblies—right 14 and left 82 assembled, the body side frame sub-assemblies are precisely positioned and secured in the body-in-white jig. Referring to FIGS. 1, 3, 4, and 9, the underbody sub-assembly 12 is positioned under the body side frame sub-assemblies 14 and 82, and the underbody 12 is raised into position so that the cross member 28 underlies the cross member extensions 60 of both the left and right body side frame sub-assemblies 82 and 14. With the underbody raised into position, a lower horizontal rim surface 86, adjacent to the right-hand longitudinal edge 24 of the underbody 12, engages the lower horizontal wall 72 of the rocker inner frame panel 58, including the extreme outboard portion 80 that underlies engaging the outboard projecting horizontal flange 74 of the body side outer panel 36. The lip 76 assists in roughly locating the underbody sub-assembly 12.

Referring to FIGS. 1, 6 and 7, an inboard projecting stiffener 88 of the "A" pillar inner panel 68 has a plurality of flanges 90 engaging the dash panel 18. Likewise, referring to FIGS. 1 and 5, an inboard projecting stiffener 92 of the "B" pillar inner panel 70 has flanges 94 engaging the floor pan 16. The torque box cover 62 also has a plurality of flanges 96 engaging the floor pan 16.

Referring to FIGS. 2, 3, 5, 7 and 9, the underbody sub-assembly 12, including the longitudinal edge 24 and the lower rim 86, is capable of being shifted in the transverse direction relative to the outboard projecting horizontal flange 74 and the lip 76 of the body side outer panel 36 as the underbody sub-assembly 12 is being positioned in the jig. In addition referring to FIG. 9, the actually distance between the longitudinal edges 24 and 29 and the spacing between the body side frame sub-assemblies 14 and 82 does not effect the positioning of the underbody sub-assembly relative to the body side frame sub-assemblies 14 and 82, since there is sufficient overlap of the sub-assemblies. Referring to FIGS. 1 and 4, the underbody sub-assembly 12 can also be skewed slightly if required for proper alignment or positioning resulting in the right longitudinal edge 24 is not being parallel to the lip 76 of the body side frame sub-assemblies 14. The skewing of the underbody sub-assembly 12 is, however, limited by the requirement that the channel shaped cross member 28 fit within the channel shaped cross member extension 60. This required adjustment of the underbody sub-assembly 12 in relation to the body side sub-assemblies could be the result of slight body build variation from body structure to body structure.

Welding together the Sub-assemblies

Referring to FIGS. 2, 3, 5 and 7, with the underbody sub-assembly 12 position relative to the body side frame sub-assemblies 14 and 82, the lower rim 86 is spot welded to the extreme outboard portion 80 of the lower horizontal wall 72 of the rocker inner frame panel 58 and the horizontal flange 74 of the body side outer panel 36 in proximity to the lip 76. Referring to FIGS. 7 and 5, the flanges 90 and 94 of the inboard projecting stiffeners 88 and 92 of both "A" pillar and the "B" pillar inner panels 68 and 70 are welded to the underbody 12. Referring to FIGS. 3 and 4, the cross member extension 60 and the cross member 28 are welded together.

Figure 8:
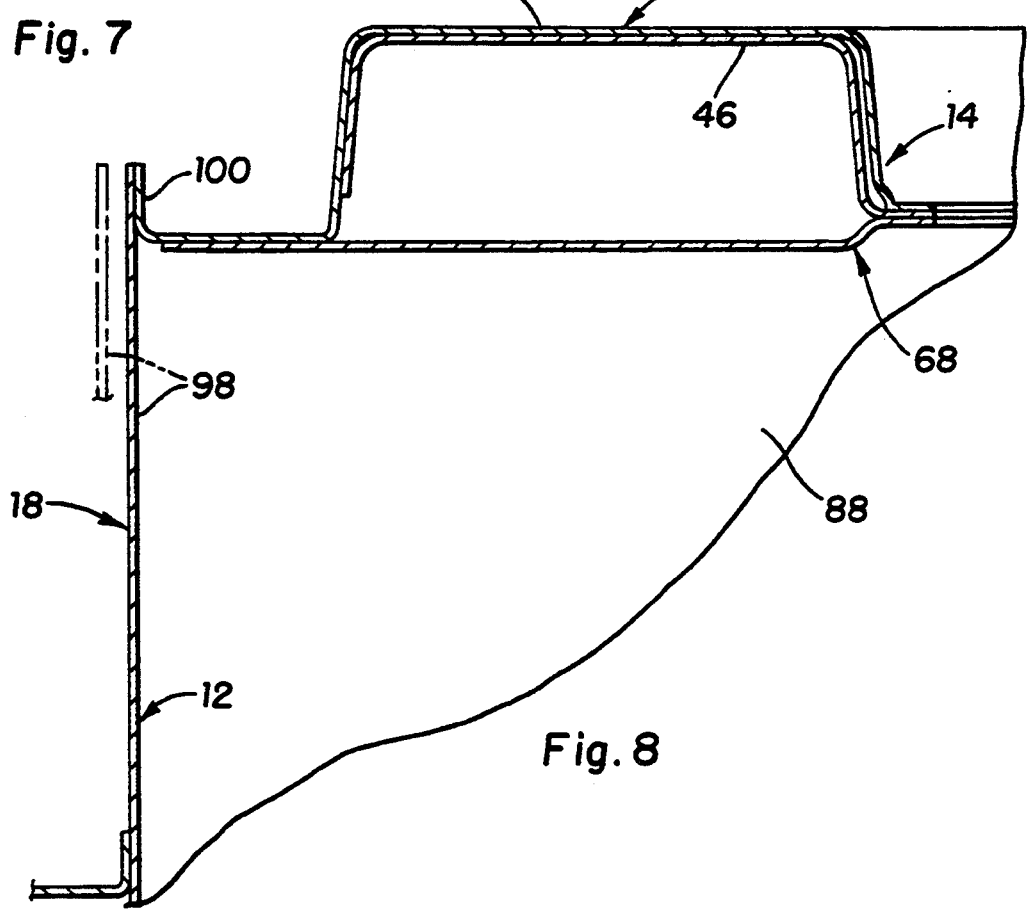
FIG. 8 is a sectional view taken at 8—8 in FIG. 1.

Referring to FIGS. 1 and 8, after the underbody sub-assembly 12 and the body side frame sub-assemblies 14 and 80 have been spot welded together at the points discussed above, a generally vertical firewall portion 98 of the dash panel 18 is spot welded to a forward generally vertical outboard projecting flange 100 of the body side outer panel 36. The firewall portion 98 of the dash panel 18 is flexed from the phantom position of FIG. 8 to the welded position; this design gap allows for fore-/aft positioning of the underbody sub-assembly 12 to the body side frame sub-assembly 14 for build variation since the fore/aft alignment of the underbody sub-assembly 12 to the body side frame sub-assembly 14 is set at the cross member 28.

Figure 10:
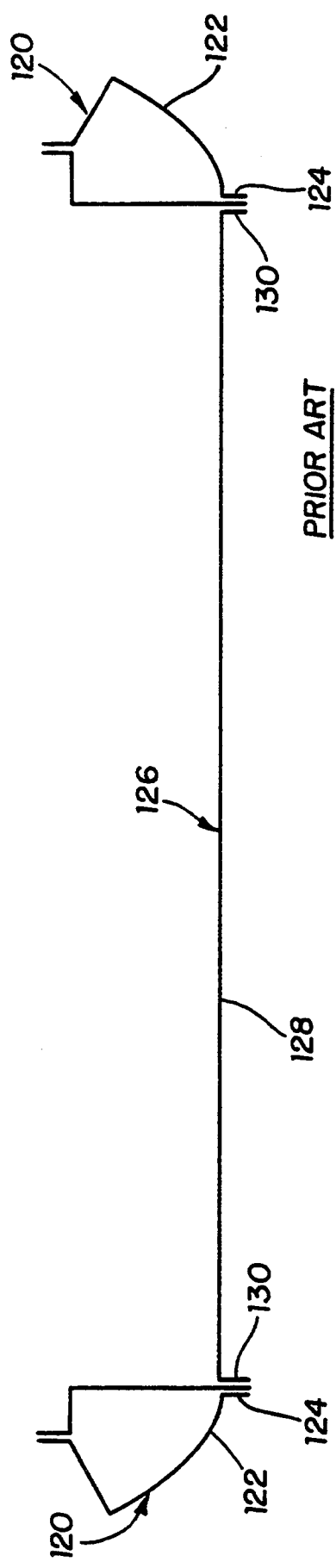
FIG. 10 is a schematic of a front view of the prior method of securing the underbody to the body side frame.

The adjustment between the sub-assemblies prior to the welding is attainable because the sub-assemblies are secured such that the underbody sub-assembly 12 is capable of being shifted in the transverse direction relative to the outboard projecting horizontal flange 74, and also being skewed slightly so that the right longitudinal edge 24 is not parallel to the lip 76 of the body side frame sub-assemblies 14 and 80 prior to the welding. This is in contrast to the prior art where the flanges are depending downward as seen in FIG. 10. This adjustment to account for build variation reduces the bending and flexing and the associated stress of the sub-assemblies required to align them in the body-in-white jig. The flexing of the vehicle body structure 10, after the sub-assemblies are secured together and the vehicle body structure 10 is removed from the body-in-white jig, to relieve the stress is reduced.

Figure 2:
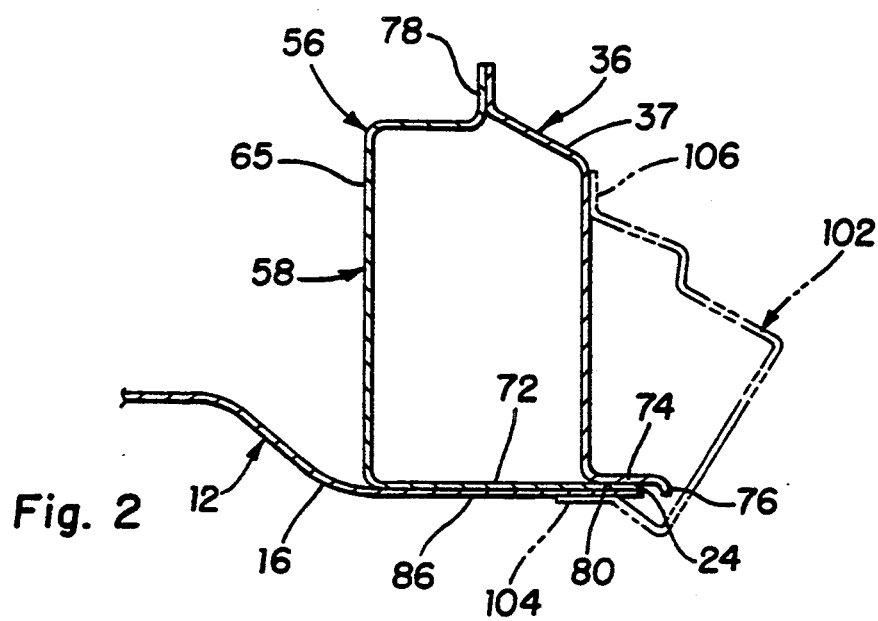
FIG. 2 is a sectional view taken at 2—2 in FIG. 1 of a transverse section of the interface between the floor pan and the body side frame. A rocker cap is shown in phantom.

Referring to FIG. 2, a rocker cap 102 has a horizontal flange 104 that underlies and is secured to the lower rim 86 of the underbody sub-assembly and a vertical flange 106 that is secured to the body side outer panel 36 for hiding the right-hand longitudinal edge 24 of the underbody 12 and the lip 76 of the body side outer panel 36. The lip 76 likewise hides the longitudinal edge 24 of the underbody 12.

While one embodiment of the present invention has been explained, various modifications within the spirit and scope of the following claims will be readily apparent to those skilled in the art.

The embodiments of the invention in which an exclusive property or privilege is claimed are defined as follows:

1. A vehicle body structure of a vehicle comprising:
a pair of body side frame assemblies extending longitudinally and spaced apart from each other, and each having a longitudinal extending generally planar horizontal surface including an outboard projecting portion;
a generally planar member extending transversely across the vehicle and having outboard longitudinal edge surfaces underlying and engaging the outboard projecting portions of the body side frame assemblies,
and weld means attaching the planar member to the outboard projecting portion so that the planar member retains to the body side frame assemblies at a precise adjusted spaced apart position.

2. A vehicle body structure of a vehicle comprising:
a pair of body side frame assemblies extending longitudinally on the vehicle and precisely spaced from each other, and each having a lower horizontal surface projecting outboard; and
an underbody sub-assembly transversing the vehicle and having a generally planar floor pan including a pair of longitudinal edges and a horizontal surface adjacent each of the longitudinal edges and each of the horizontal surfaces of the floor pan underlying and engaging one of the lower horizontal surfaces of the body side frame assemblies;
and weld means attaching the horizontal surfaces of the floor pan to the lower horizontal surfaces projecting outboard of the body side frame assemblies subsequent to adjusting the underbody sub-assembly transversely relative to the body side frame assemblies.

3. The vehicle body structure as in claim 2 wherein the lower horizontal surface of each of the body side frame assemblies has a lip depending downward, outboard of the horizontal surface of the underbody for roughly positioning and hiding the longitudinal edges of the floor pan.

4. The vehicle body structure as in claim 3 wherein a pair of rocker caps extend longitudinally and each has a vertical flange for engaging one of the body side frames and a horizontal flange for underlying and engaging one of the horizontal surfaces of the floor pan so that the rocker cap covers the engagement of the horizontal surface of the floor pan to the horizontal surface of the body side frame assembly.

5. The vehicle body structure as in claim 2 wherein each of the body side frames has a channel shaped cross member extension attached thereto and projecting transversely inboard therefrom; and
a channel shaped cross member extending transversely and overlying and secured to the floor pan and having an end adjustably received by each of the channel shaped cross member extensions of the body side frame assemblies to enable transverse adjustment of the side frame assemblies relative one another and the floor pan, and weld means securing the cross member extension to the channel shaped cross member.

6. A vehicle body structure of a vehicle comprising:
(a) a pair of body side frame sub-assemblies running longitudinally on the vehicle and each including;
  (i) a body side outer panel having an appearance portion extending vertically and longitudinally, outboard projecting horizontal flange extending longitudinally and projecting outboard, and a forward generally vertical outboard projecting flange,
  (ii) a rocker inner frame extending longitudinally having an inboard vertical wall spaced inboard from the body side outer panel and a lower horizontal wall projecting outboard having an extreme outboard portion underlying the lower horizontal flange of the body side outer panel,
  (iii) an inverted "U" shaped cross member extension secured to the inboard vertical wall of the rocker inner frame and projecting transversely inboard
(b) an underbody sub-assembly for extending transversely across the vehicle and including
  (i) a generally planar floor pan having a pair of outboard longitudinal edges and a horizontal surface adjacent each of the longitudinal edges and underlying and engaging the lower horizontal wall of the rocker inner frame of one of the body side frame sub-assemblies,
  (ii) an inverted "U" shaped cross member extending transversely and overlying and secured to the floor pan and having a pair of ends, each end underlying one of the cross member extensions and the horizontal surface of the floor pan secures to the extreme outboard portion and the cross member secures to the cross member extension subsequent to the underbody sub-assembly adjusted transversely relative to the body side frame sub-assemblies, and
  (iii) a dash panel having a horizontal portion including a lip securing to the floor pan and the dash panel having a generally vertical firewall portion flexed and conformed to the forward vertical flange of the body side outer panel of the body side frame sub-assemblies.

7. The vehicle body structure of claim 6 wherein the body side outer panels each have a lip depending downward from the lower horizontal flange for roughly locating and hiding the longitudinal edges of the floor pan.

8. The vehicle body structure of claim 7 wherein a pair of rocker caps extend longitudinally, and each has a vertical flange for engaging the body side frame and a horizontal flange for underlying and engaging the horizontal surface of the floor pan so that the rocker cap covers the engagement of the horizontal surface of the floor pan to the horizontal surface of the body side frame assembly.

9. The vehicle body structure of claim 6 wherein the body side frame sub-assemblies have a plurality of inner panels and each having an inboard projecting stiffener overlying and engaging the floor pan for stiffening the vehicle body structure.

10. A vehicle body structure comprising:
a pair of body side assemblies, each having a longitudinal extending rocker assembly and vertical pillars defining door openings, said rocker assemblies being defined by an inner panel and an outer panel welded together at outboard extending edge portions thereof providing a horizontal projecting pinch weld flange extending longitudinally of the vehicle body,
and a generally planar panel member extending transversely across the vehicle and having outboard longitudinal edges respectively underlying and engaging the underside of the pinch weld flange of the rocker assembly of one of the pair of body side assemblies,
and a plurality of welds attaching the longitudinal edge of the planar panel member to the under side of the pinch weld flange of one of the rocker assemblies to permanently establish the body side assemblies at precise adjusted spaced apart positions.

* * * * *